(12) United States Patent
Allen et al.

(10) Patent No.: US 7,617,039 B2
(45) Date of Patent: Nov. 10, 2009

(54) METHOD OF FUEL INJECTION

(75) Inventors: Jeffrey Allen, Attleborough (GB); Paul Bartholomew Ravenhill, Dereham (GB); Steven Barraclough, Wymondham (GB); Benjamin David Smither, Diss (GB); Timothy Guy Drake, Mulbarton (GB)

(73) Assignee: Scion-Sprays Limited, Hethel, Norwich, Norfolk (GB)

( * ) Notice: Subject to any disclaimer, the term of this patent is extended or adjusted under 35 U.S.C. 154(b) by 78 days.

(21) Appl. No.: 12/038,915

(22) Filed: Feb. 28, 2008

(65) Prior Publication Data

US 2009/0222193 A1   Sep. 3, 2009

(30) Foreign Application Priority Data

Feb. 28, 2007   (GB) ................ 0703880.5

(51) Int. Cl.
   *F02M 51/00*   (2006.01)
(52) U.S. Cl. ............ 701/110; 701/103; 123/299; 123/436; 123/480
(58) Field of Classification Search ........ 123/299, 123/305, 436, 73 B, 73 C, 472, 480; 701/103–105, 701/110
See application file for complete search history.

(56) References Cited

U.S. PATENT DOCUMENTS

| | | | | |
|---|---|---|---|---|
| 4,499,878 A | * | 2/1985 | Igashira et al. | 123/478 |
| 5,450,828 A | * | 9/1995 | Sakamoto et al. | 123/339.11 |
| 5,988,141 A | * | 11/1999 | Uchida | 123/436 |
| 6,694,945 B2 | * | 2/2004 | Kawaguchi et al. | 123/299 |
| 7,438,050 B2 | * | 10/2008 | Allen | 123/436 |
| 7,533,655 B2 | * | 5/2009 | Allen | 123/436 |

FOREIGN PATENT DOCUMENTS

GB   2421543 A   6/2006

OTHER PUBLICATIONS

Patents Act 1977: Search Report under Section 17, Date of Search: Apr. 27, 2007 Application GB0703880.5.
Patents Act 1977: Further Search Report under Section 17, Date of Search: Nov. 21, 2007 Application GB0703880.5.

* cited by examiner

*Primary Examiner*—Hai H Huynh
(74) *Attorney, Agent, or Firm*—Luedeka, Neely & Graham, PC (57) ABSTRACT

The present invention relates to a method of operating an internal combustion engine. With reference to FIG. 1, fuel is supplied to charge air using an injector (116) which in each operation delivers a set amount of fuel. The amount of fuel supplied to the charge air in each engine cycle is controlled by how many times the injector (116) operates in each cycle. A desired fuel demand is calculated as a number of operations of the injector per cycle, calculated to at least one decimal place. The desired fuel demand is rounded to a near integer to provide an output fuel demand for the injector as a number of operations of the injector for the next operating cycle in varying operating conditions of the engine. In steady state operating conditions of the engine an aggregate number of operations for a plurality of engine cycles is calculated which is closer to an aggregated desired fuel demand for the plurality of cycles than if for each cycle of the plurality of output cycles the output fuel demand is calculated independently.

11 Claims, 6 Drawing Sheets

METHOD OF FUEL INJECTION

This invention relates to a method of fuel injection for an internal combustion engine and to a fuel injection system or a fuel injection unit for implementing the method.

Most internal combustion engines in automobiles currently use fuel injection systems to supply fuel to the combustion chambers of the engine. Fuel injection systems have replaced the earlier technology of carburettors because they give better control of the delivery of fuel and enable the engine to meet emission legislation targets as well as improving overall efficiency.

It is important that the fuel injection system delivers an appropriate amount of fuel at an appropriate time. Inappropriate delivery of the fuel may lead to a reduction in the output power of the engine and a wastage of fuel.

Whilst the sophisticated and highly developed fuel injection systems currently available (as described above) are ideal for use in internal combustion engines in automobiles, there are many other applications for internal combustion engines where such a level of sophistication is not appropriate and too costly. For instance, small single cylinder engines as used for a variety of engine powered gardening devices (such as lawn mowers, hedge trimmers, chain saws, rotovators, lawn aerators, scarifiers and shredders), small generators, mopeds, scooters, etc. are built to very tight cost targets and therefore cannot afford the cost of a sophisticated fuel injection system. To date, such small engines have used traditional cheaper carburettor technology. However, small engines of this type will soon face the same kind of exhaust gas emission legislation as automobile engines and so must be modified to meet the emission targets. Therefore, a cheap and simple system of fuel injection is required for such small engines.

In GB 2425188 the applicant described a fuel injection unit suitable for a small engine. The injector described injects in each operation a set amount of fuel into the charge air; the controller of the unit decided in each engine cycle how much fuel was needed and then operated the injector a number of times to come closest to the ideal amount of fuel. Since the amount of fuel can only be controlled in steps equivalent to the volume dispensed by the injector, the control was quite coarse. The engine could be over-fuelled or under-fuelled.

According to a first aspect of the invention, there is provided a method of operating an internal combustion engine comprising the steps of:

supplying fuel to charge air using an injector which in each operation delivers a set amount of fuel;

controlling how much fuel is supplied to the charge air in each engine cycle by controlling how many times the injector operates in each engine cycle;

determining from engine speed and load a desired fuel demand as a number of operations of the injector calculated to at least one decimal place;

rounding the desired fuel demand to a near integer to provide an output fuel demand for the injector as a number of operations of the injector for the next operating cycle in an operating condition of the engine in which the engine speed and/or load varies by more than (a) set parameter(s) between consecutive engine cycles; and when a steady state condition of constant or near constant engine speed and/or load exists over a plurality of engine cycles, controlling the output fuel demands sent to the injector over the plurality of cycles to operate the injector an aggregate number of operations closer to an aggregated desired fuel demand for the plurality of cycles than if for each cycle of the plurality of output cycles the output fuel demand is calculated independently.

According to a second aspect of the invention, there is provided a method of operating an internal combustion engine comprising the steps of:

supplying fuel to charge air using an injector which in each operation delivers a set amount of fuel;

controlling how much fuel is supplied to the charge air in each engine cycle by controlling how many times the injector operates in each engine cycle;

recognising a varying state operating condition of the engine when the engine speed and/or load has varied by more than the set parameter(s) between consecutive engine cycles;

recognising a steady state operating condition of the engine when the engine speed and/or load varies by less than set parameter(s) between consecutive engine cycles for at least a preset number of consecutive engine cycles;

when the varying operating state condition has been recognised then for each engine cycle individually determining from engine speed and load a desired fuel demand as a number of operations of the injector calculated to at least one decimal place and rounding the desired fuel demand to a near integer to provide an output fuel demand as a number of operations of the injector for the next operating cycle; and when the steady state operating condition has been recognised then for a plurality of engine cycles determining from engine speed and load a desired fuel demand as an aggregate number of operations of the injector over the plurality of the operating cycles and controlling the operation of the injector over the plurality of engine cycles to achieve the desired fuel demand with the number of operations in at least one engine cycle of the plurality differing from the number of operations in other engine cycles of the plurality.

According to a third aspect of the invention, there is provided a method of operating an internal combustion engine comprising the steps of:

supplying fuel to charge air using an injector which in each operation delivers a set amount of fuel;

varying fuel supply from engine cycle to engine cycle by varying the number of operations of the injector in each engine cycle;

at the start of each engine cycle determining a desired fuel demand for the cycle from engine speed and engine load;

calculating a desired aggregate number of operations of the injector over a set of engine cycles of a chosen number using the most recently determined desired demand for a single cycle; and determining a number of operations to be implemented by the injector in the engine cycle by: calculating how many cycles are left remaining in the set of cycles; by subtracting the number of operations already performed by the injector in cycles of the set from the calculated desired aggregate number of operations; and by dividing the result of the subtraction by the number of remaining cycles and rounding the result to a near integer.

Without increasing the complexity or cost of the injection apparatus itself the applicant has devised a way to achieve finer control of the amount of fuel delivered to a combustion chamber in each cycle to improve the efficiency of the engine, its fuel consumption and its emissions.

Internal combustion engines that make use of embodiments of the invention can do away with complicated, heavy and expensive fuel injection timing systems Instead, they may make use of a cheaper and simpler system.

Further respective aspects and features of the invention are defined in the appended claims.

Embodiments of the invention will now be described with reference to the accompanying drawings, in which.

Figure 1:
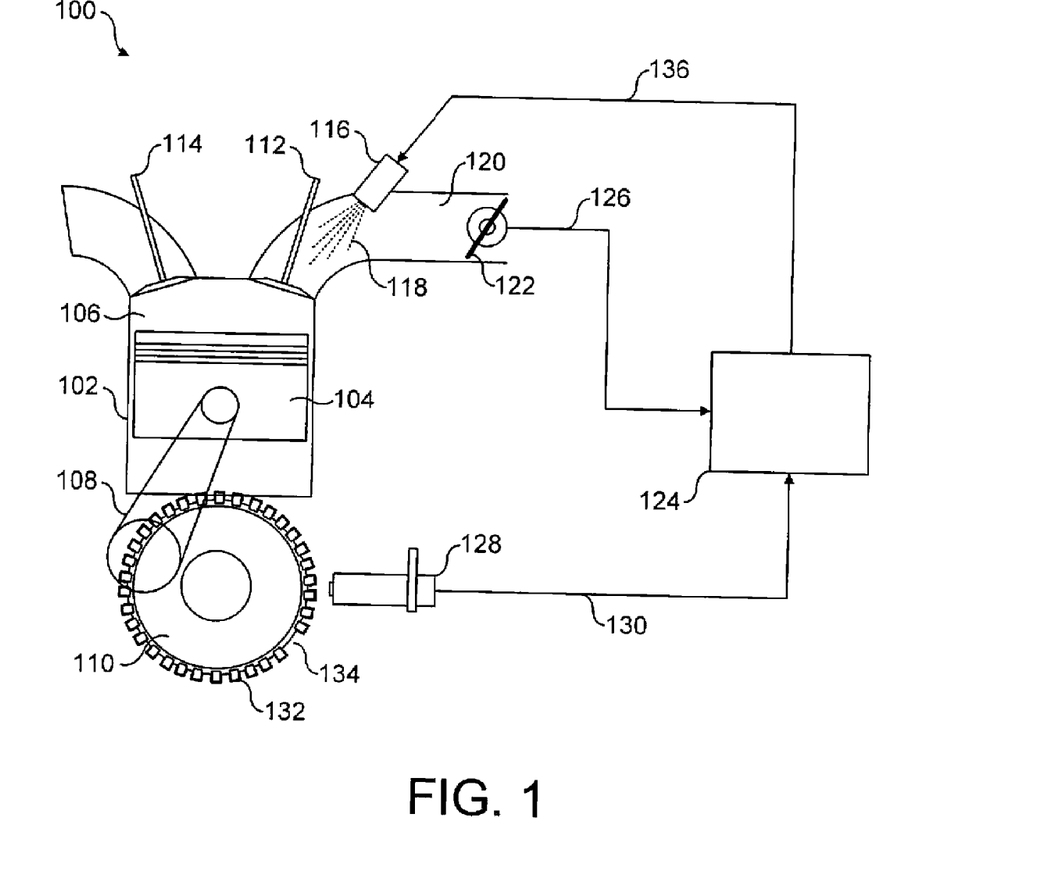
FIG. 1 schematically illustrates a first embodiment of internal combustion engine having a fuel injection system according to the present invention.

FIG. 1 illustrates an internal combustion engine 100 comprising a cylinder 102 in which reciprocates a piston 104 with the piston 104 and the cylinder 102 defining between them a combustion chamber 106. The piston 104 is connected by a connecting rod 108 to a crankshaft 110. The crankshaft 110 drives a camshaft (not shown) which in turn drives an inlet valve 112 and an exhaust valve 114. The inlet valve 112 and the exhaust value 114 are driven in timed relationship to the movement of the piston 104 in the cylinder 102, with return springs (not shown) biasing the valves 112, 114 back into their valve seats.

The fuel injection system of the engine 100 comprises a fuel injector 116 arranged to deliver fuel 118 into an inlet passage 120 upstream of the inlet valve 112. A throttle valve 122 is placed in the inlet passage 120 to control the flow of charge air into the inlet passage 120 and the combustion chamber 106.

An engine control unit 124 controls the time at which the fuel 118 is injected into the charge air present in the inlet passage 120 and also controls the quantity of fuel 118 that is injected. The engine control unit 124 receives a signal from the throttle valve 122 via a control line 126, the signal indicating the rotational position of the throttle valve 122 and hence the engine load. Additionally, the engine control unit 124 receives a timing signal from a crankshaft sensor 128 (which could be replaced by a camshaft sensor) via a control line 130. The crankshaft sensor 128 is responsive to teeth 132 on the crankshaft 110 and to a gap 134 in the teeth 132. The engine control unit 124 can determine, from the timing signal received from the crankshaft sensor 128, the speed of the engine 100 and the position of the piston 104 within the cylinder 102, this being used to determine the timing of opening and closing of the inlet valve 112. Having regard to the timing signal produced by the crankshaft sensor 128 and the load signal produced by the sensor attached to the throttle valve 122, the engine control unit 124 generates a control signal which is relayed to the injector 116 via a line 136 and controls the operation of the injector 116.

Figure 2:
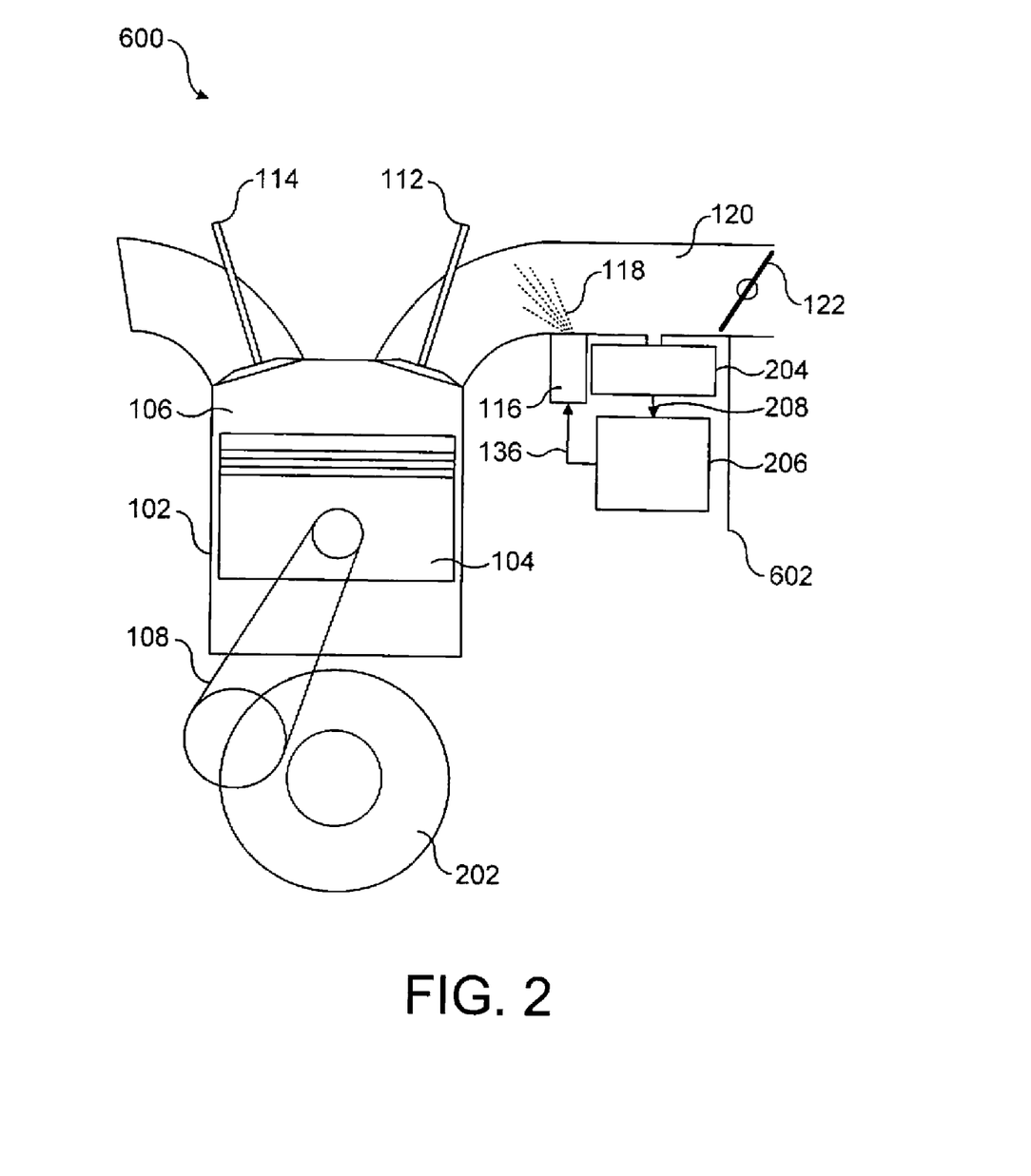
FIG. 2 schematically illustrates a second embodiment of internal combustion engine having a fuel injection unit according to the present invention.

FIG. 2 schematically illustrates an internal combustion engine 600 having a fuel injection unit 602. The internal combustion engine 600 is similar to the internal combustion engine 100 shown in FIG. 1. Components of the engine 600 that are the same as components of the engine 100 are given the same reference numeral and, for conciseness, a description of them will not be repeated.

The engine 600 has a crankshaft 202, which is similar to the crankshaft 110 shown in FIG. 1, except that the crankshaft 202 does not have the teeth 132 and hence does not have the gap 134.

The engine 600 also has a pressure sensor 204 for detecting the pressure of the air within the inlet passage 120. The pressure sensor 204 supplies an electronic controller 206 with a pressure signal via a control line 208.

The electronic controller 206 determines, from the pressure signal received from the pressure sensor 204: (i) the engine load; (ii) the engine speed; and (iii) the timing of the opening and/or closing of the inlet valve 112. This will be described in more detail later. In addition, as before, the electronic controller 206 generates a control signal which is relayed to the injector 116 via the line 136 and controls operation of the injector 116.

In the engine 100 shown in FIG. 1, the engine control unit 124 uses the signal from the crankshaft sensor 128 to determine the engine speed and the timing of the opening and closing of the inlet valve 112. The electronic controller 206 determines both the engine speed and the timing of the opening and closing of the inlet valve 112 from the pressure signal received from the pressure sensor 204 and the engine 200 does not require the crankshaft sensor 128 of the engine 100 (nor the control line 130). Thus the crankshaft 202 of the engine 200 is more simply formed than the crankshaft 110 of the engine 100, i.e. the crankshaft 200 does not need to be provided with the teeth 132 and the gap 134.

In the engine 100 shown in FIG. 1, the engine control unit 128 uses the load signal from the sensor attached to the throttle valve 122 to determine the engine load. The electronic controller 206 determines the engine load from the pressure signal received from the pressure sensor 204 and the engine 600 does not require the sensor attached to the throttle valve 122 (nor the control line 126).

Figure 3:
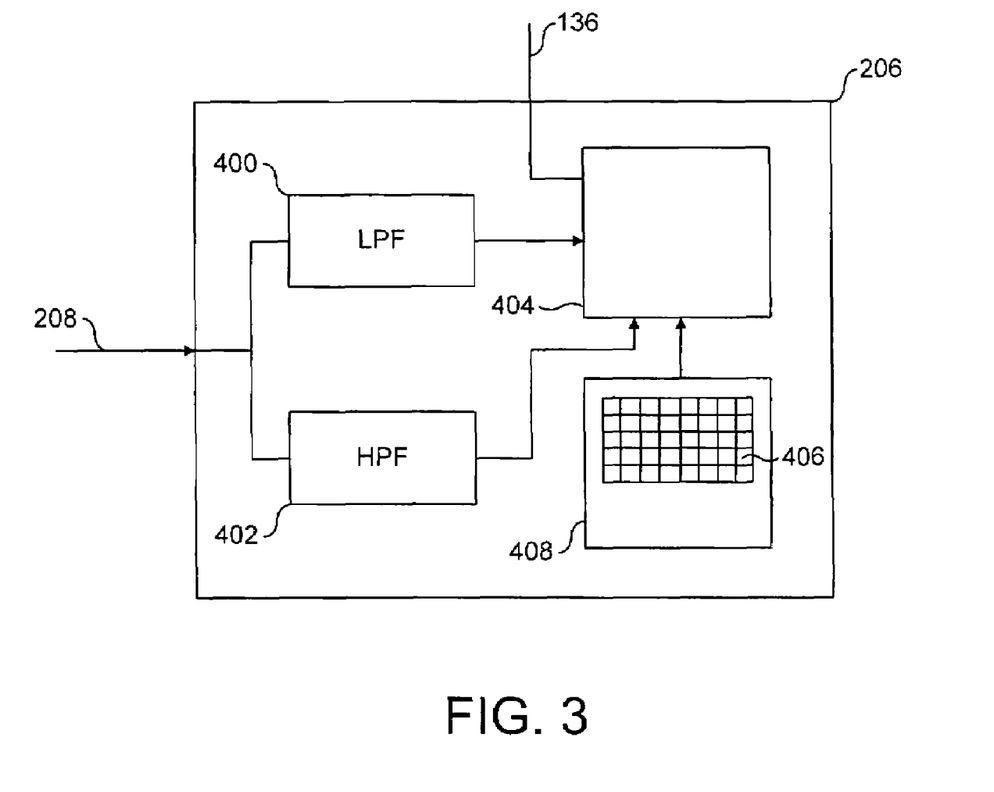
FIG. 3 schematically illustrates the electronic controller used in the fuel injection unit of FIG. 2.

FIG. 3 schematically illustrates the electronic controller 206. The pressure signal from the pressure sensor 204 representing the pressure of the air in the inlet passage 120 is received by the engine control unit 206 via the control line 208. The pressure signal is then supplied to a low pass filter 400 and a high pass filter 402. The outputs of the low pass filter 400 and the high pass filter 402 are supplied separately to a processor 404. The processor 404 has access to a look-up-table 406 stored in a memory 408. The processor 404 uses the output of the low pass filter 402, the output of the high pass filter 404 and the look-up-table 406 to generate a control signal to be supplied to the injector 116 via the control line 136.

The processor unit 404 uses the low pass filtered pressure signal to determine the load of the engine 200. The processor unit 404 also uses the high pass filtered pressure signal to determine the speed of the engine 200 and the timing of the opening and closing of the inlet valve 112.

Figure 4:
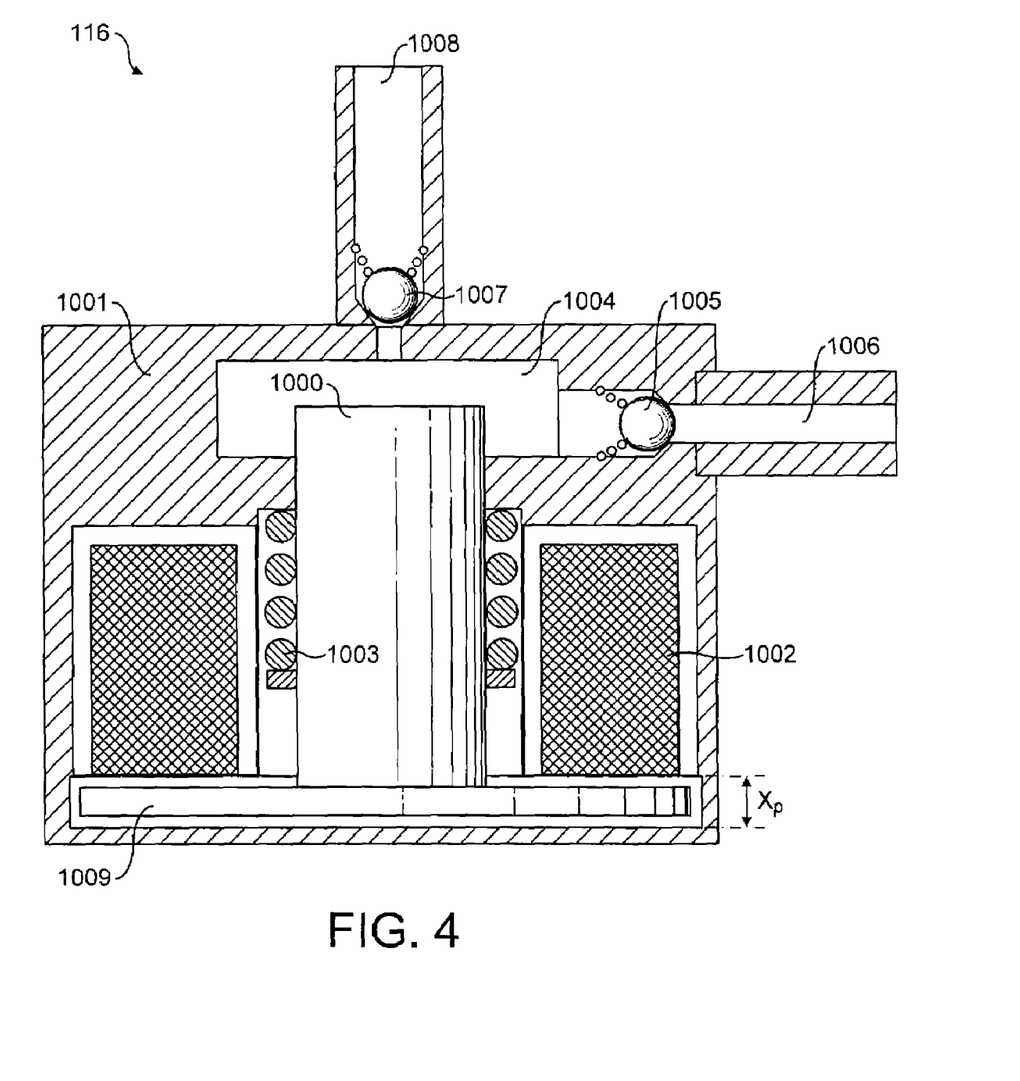
FIG. 4 schematically illustrates a fuel injector for use in the fuel injection system of FIG. 1 or the fuel injection unit of FIG. 2.

FIG. 4 shows an embodiment of an injector 116. It comprises a piston 1000 slideable in a housing 1001. The piston 1000 is acted upon by a solenoid 1002 and by a biasing valve spring 1003. The piston is moveable to draw fuel into and dispense fuel from a fuel chamber 1004. A one-way inlet valve 1005 allows fuel to flow into the fuel chamber 1004 from a fuel inlet 1006, while preventing flow of fuel out of the fuel chamber 1004 to the fuel inlet 1006. A one-way sprung-loaded outlet valve 1007 allows fuel to be dispensed from the fuel chamber 1004 to a fuel outlet 1008, but prevents fuel being drawn back into the fuel chamber 1004 from the fuel outlet 1008.

In the operation of the fuel injector 116 the activation of the solenoid 1002 moves the piston 1000 against the biasing force of the spring 1003 to displace from the fuel chamber 1004 fuel via the outlet valve 1007 to the fuel outlet 1008. Then, when the solenoid 1002 is de-energised the biasing spring 1003 forces the piston 1000 to move to draw fuel into the fuel chamber 1004 via the inlet valve 1005. The piston 1000 has a defined piston stroke $X_p$ This piston stroke is defined by setting the travel of the piston between two end stops. By setting a definite piston travel the amount of fuel dispensed in each dispensing operation of the fuel injector 116 can be set at a set value. Thus, whenever the solenoid 1002 is operated then the fuel injector 116 dispenses a set amount of fuel. This means that in each engine cycle the amount of fuel dispensed by the fuel injector 116 can be controlled by controlling the number of times that the solenoid 1002 is activated during the engine cycle. Unlike pulse width modulated injectors, the amount of fuel delivered by the fuel injector is insensitive to pressure variations in the intake passage 1006.

Previously it has been proposed for each engine cycle to take measured engine speed and load and then use a look-up table to determine how many times in the engine cycle the injector 116 should be operated. This was determined separately for each engine cycle, independently of all other engine cycles. However, this gives only a coarse control of the amount of fuel going into the engine for combustion.

The applicant has realised that not all fuel dispensed by the injector 116 prior to a combustion cycle reaches the combustion chamber and is combusted. Instead a significant amount of fuel hangs on the walls of the intake passage 120. This is usually considered undesirable and so the injector 116 is usually situated as near as possible to the back of the valve head of valve 112 to minimise the length of the passage 120 in whose walls fuel can hang.

The applicant has realised that the fact that fuel hangs on walls, normally felt undesirable, can be used to advantage in the use of an injector as described above with reference to FIG. 4. The applicant has designed new control strategies to be used by the electronic controllers 124 of FIG. 1 and 206 of FIGS. 2 and 3. The strategies are illustrated by the flow charts of FIGS. 5 and 6.

Figure 5:
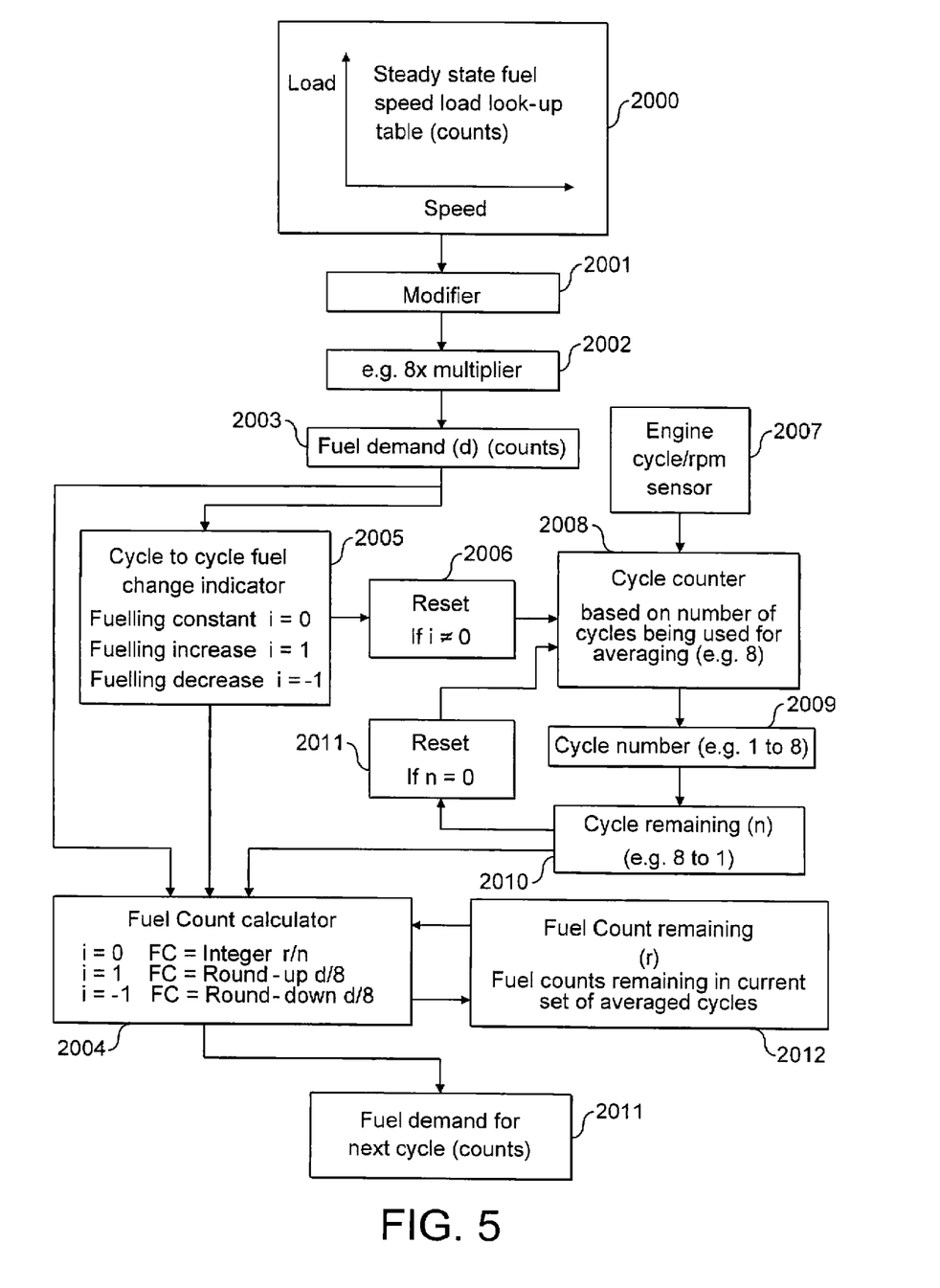
FIG. 5 is a flowchart of a first method of operation of the engine control unit illustrated in FIGS. 1 and 2.

Turning first to FIG. 5, as described in the previous patent GB 2425188, the controller 124 or 206 will use measured engine load and speed to address a look-up table at step 2000. This will give an idealised amount of fuel to be delivered by the injector 116 for a single engine cycle. This figure can be modified at 2001 to take account of factors such as changing engine temperature, fuel temperature, atmospheric pressure, etc, although this step is optional.

The innovation of the first fuelling strategy of the present invention is to move away from looking at a single engine cycle and to consider instead 8 consecutive cycles. This happens at 2002, where the ideal amount for one cycle is multiplied to give the total needed over 8 operating cycles of the engine. Then a fuel demand (d) as a number of operations of the injector 116 is calculated at 2003 and this is fed on to a fuel count calculator 2004, which will be described later.

The fuel demand (d) is calculated for every cycle of the engine. At 2005 it is determined (by comparing the new fuel demand with the previous fuel demand) whether the fuel demand is constant or increasing or decreasing. This result is communicated to the fuel count calculator 2004. Also if the demand is not constant, but is increasing or decreasing then this information is fed to a reset function 2006.

A sensor 2007 either measures the rate of revolution of the engine (rpm) or in some other way notes the beginning of each new engine cycle (in the FIG. 1 embodiment the sensor 2001 can be provided by sensor 128 and in the FIG. 2 embodiment the sensor can be provided by the sensor 204). This information is fed to a cycle counter 2008. In the illustrated embodiment the cycle counter counts sets of 8 cycles. However, this only happens if the fuel demand is constant and the counter is reset to start again at zero if the reset function 2006 dictates this.

The cycle number (i.e. 1 to 8) is output at 2009 and at 2010 the number of cycles remaining of a set of 8 is determined. If it is determined that no cycles are left then the reset function 2011 is alerted and this then resets the counter 2008 to zero.

The number of cycles remaining (n) is fed to the fuel count calculator 2004. This calculates the fuel demand for the next engine cycle as a number of operations of the injector 116 during the cycle. This is output at 2011.

The number of injector operations for 8 cycles has already been calculated as (d) at 2003. In a steady state condition the calculator calculates the number of injector operations by dividing the number of operations left in an 8 cycle sequence (r) by the number of cycles remaining (n) calculated at 2010. The result is rounded to the nearest integer. The number of remaining operations (r) is calculated at 2012. Initially it will be (d) at the start of a set of 8 cycles, but it will be decreased each cycle by the fuel demand output at 2011 by the calculator 2004. This is why the flowchart has an arrow leading from the calculator 2004 to the fuel count remaining calculator 2012.

The above operation will lead to the number of operations in a cycle varying from cycle to cycle despite a constant fuel demand in all cases other than when the total fuel demand for the cycle is exactly divisible by 8. For instance if the number of operations over 8 cycles is 70 then:

1. For the first cycle the number of operations will be determined as 70/8=8.75, therefore the number of operations output at 2011 will be 9.

2. For a second cycle the number of operations will be determined as (70−9)/7=61/7=8.71, therefore again the number of operations output at 2011 will be 9.

3. For a third cycle the number of operations will be determined as (70−18)/6=52/6=8.67, therefore again the number of operations output at 2011 will be 9.

4. For a fourth cycle the number of operations will be determined as (70−27)/5=43/5=8.6, therefore again the number of operations output at 2011 will be 9.

5. For a fifth cycle the number of operations will be determined as (70−36)/4=34/4=8.5, therefore again the number of operations output at 2011 will be 9.

6. For a sixth cycle the number of operations will be determined as (70−45)/3=25/3=8.33, therefore the number of operations output at 2011 will be 8.

7. For a seventh cycle the number of operations will be determined as (70−53)/2=17/2=8.5, therefore again the number of operations output at 2011 will be 9.

8. For the eighth and final cycle the number of operations will be determined as (70−62)/1=8/1=8, therefore again the number of operations output at 2011 will be 8.

By varying the number of operations stroke to stroke, the controller achieves a finer degree of control—in effect giving steps equal to ⅛ of the volume of fuel dispensed by the injector. There will be no noticeable unevenness in the running of the engine because the effect of the fuel 'hanging' on the walls serves to average the fuel delivered to the combustion chamber in any event.

If the fuel demand increases or decreases then the set of 8 cycles will be broken and a new set calculated. During changing demand the calculator 2004 will suspend its normal rounding operation and always round up to the nearest integer in the case of increasing demand or always round down to the nearest integer n the case of decreasing demand.

Whilst the example above discusses averaging over 8 cycles, the method could be applied over any number of cycles from 2 to 16. Indeed, the number of cycles in the set considered for averaging purposes could itself be varied with engine speed and/or load. When the engine operation is very stable then the number of cycles for averaging could be 12-16 to achieve best refined performance, whilst if the operating conditions are "slowly" varying then the number of cycles in the set could be 2 or 3.

Figure 6:
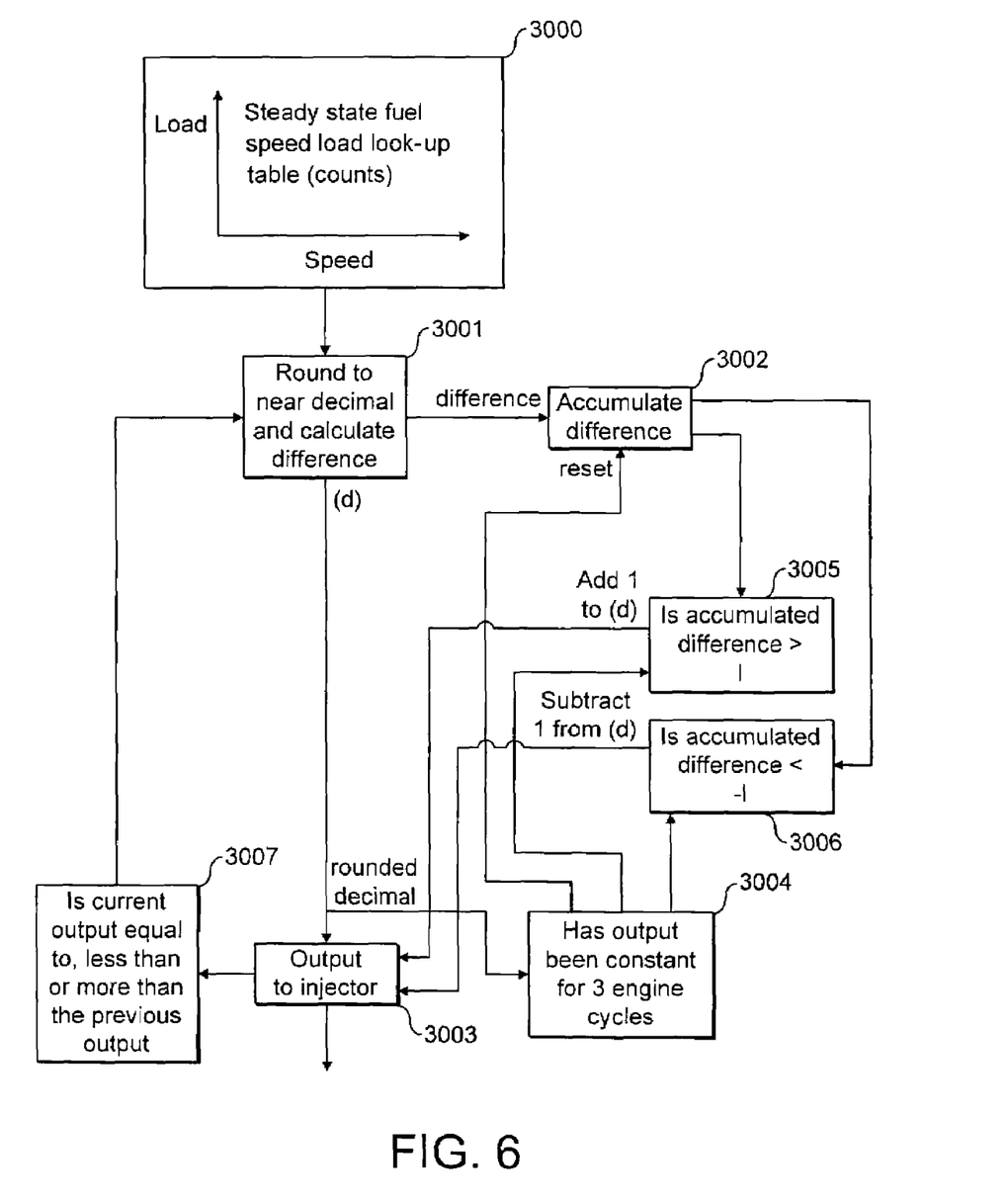
FIG. 6 is a flowchart of a second method of operation of the engine control unit illustrated in FIGS. 1 and 2.

FIG. 6 illustrates a second method of operation according to the present invention. As with the first method there is an initial step taken (at 3000 in the Figure) at the beginning of each engine cycle in which a desired fuel demand is calculated based upon the measured engine speed and load at the beginning of the engine cycle. The desired amount is determined as a number of operations of the fuel injector, such number be calculated to one or two decimal places. For instance, a desired fuel demand might be 3.6 operations of the fuel injector. Obviously the injector itself can only operate 3 times a cycle or 4 times a cycle and cannot itself operate 3.6 times a cycle.

At 3001 the fuel demand is rounded to a near decimal. For instance, a 3.6 fuel demand may be rounded to 4. This is an output as a demand D. The difference between the output demand D and the input demand calculated at 3000 is determined, in this case −0.4. This difference is output to 3002.

The output demand D is relayed to 3003. At 3003 the final output to the injector is determined.

At 3004 the demand D is monitored to see whether it is constant (i.e. within predefined limits, e.g. not varying by plus or minus 2 cycles) for 3 or more cycles. If a demand has been constant for 3 or more cycles then a signal is sent to the box 3002 to start accumulating the difference signals sent from box 3001. If the output is varying or has not been constant for at least 3 cycles then a reset signal is sent to the box 3002 to clear the box 3002 back to zero.

In steady state conditions, the difference calculated at 3001 will be accumulated at 3002. Then, at 3005 it is determined whether the accumulated difference is greater than 1. If the accumulated difference is greater than 1 and if the demand D has been constant for at least the 3 preceding engine cycles then one is added to the number D at box 3003 so that the output from 3003 is D+1.

At 3006, it is determined whether the accumulated difference at 3002 is less than −1. If the accumulated difference is less than −1 and if the demand D for at least the previous 3 engine cycles has been constant then 1 is subtracted from D at 3003 and the output to the injector is D−1.

During times of decreasing or increasing demand the rounding operation at 3001 can be varied. At 3007 it is determined whether the output D is less than, equal to or more than the immediately preceding output D. If the current output is less than the preceding output D then at 3001 the rounding operation is always downwards. For instance, 3.8 would be rounded down to 3. If the demand D is constant then at 3001 there will be rounding to the nearest integer. If the demand D is increasing then at 3001 the demand is always rounded up to the nearest integer, e.g. 3.2 would be rounded up to 4. This adds in an anticipation of a need for a fuelling increase or a fuelling decrease in the next cycle.

The method in FIG. 6 allows an averaging to take place over a number of engine cycles to give a total fuel delivery to the combustion chamber which is closer to that determined at the step 3000 than if no differences are accumulated in the process.

Both of the methods of FIGS. 5 and 6 give averaging during steady state conditions.

The invention claimed is:

1. A method of operating an internal combustion engine comprising the steps of:
   supplying fuel to charge air using an injector which in each operation delivers a set amount of fuel;
   controlling how much fuel is supplied to the charge air in each engine cycle by controlling how many times the injector operates in each engine cycle;
   determining from engine speed and load a desired fuel demand as a number of operations of the injector calculated to at least one decimal place;
   rounding the desired fuel demand to a near integer to provide an output fuel demand for the injector as a number of operations of the injector for the next operating cycle in an operating condition of the engine in which the engine speed and/or load varies by more than (a) set parameter(s) between consecutive engine cycles; and
   when a steady state condition of constant or near constant engine speed and/or load exists over a plurality of engine cycles, controlling the output fuel demands sent to the injector over the plurality of cycles to operate the injector an aggregate number of operations closer to an aggregated desired fuel demand for the plurality of cycles than if for each cycle of the plurality of output cycles the output fuel demand is calculated independently.

2. A method as claimed in claim 1 wherein: during the steady state operating condition the aggregate number of operations of the injector is calculated for a set of engine cycles of a chosen number using the most recently determined desired demand for a single cycle; and a number of operations to be implemented by the injector in the each engine cycle of the set is calculated by: calculating how many cycles are left remaining in the set of cycles; by subtracting the number of operations already performed by the injector in cycles of the set from the calculated desired aggregate number of operations; and by dividing the result of the subtraction by the number of remaining cycles and rounding the result to a near integer.

3. A method as claimed in claim 2 wherein the chosen number of cycles in the set is between two and eight.

4. A method as claimed in claim 2 including varying the chosen number of cycles with variations in engine operation.

5. A method as claimed in claim 1 wherein during the steady state operating condition the method includes: calculating in each engine cycle a difference between the desired fuel demand and the output fuel demand; aggregating the difference over the plurality of engine cycles; when the aggregated difference is equal to or greater than one then for the next engine cycle increasing by one the output fuel demand for the injector; and when the aggregated fuel demand is equal to or less than minus one then for the next engine cycle reducing by one the output fuel demand for the injector.

6. A method as claimed in claim 5 wherein when the engine operating condition changes from the steady state condition to an operating condition of the engine in which the engine speed and/or load varies by more than (a) set parameter(s) between consecutive engine cycles, then the aggregated difference is reduced to zero.

7. A method as claimed in claim 1 wherein the steady state condition is recognised only after the engine has operated with constant or near constant engine speed and/or load for a preset number of engine cycles.

8. A method as claimed in claim 7 wherein the preset number of cycles is at least three.

9. A method as claimed in claim 1 wherein the rounding the desired fuel demand to a near integer during operation of the engine with varying engine speed and/or load is modified depending of whether the output fuel demand has decreased or increased over preceding engine cycles; when the output fuel demand has increased then the desired fuel demand is rounded up to the nearest integer; and when the output fuel demand has decreased then the desired fuel demand is rounded down to the nearest integer.

10. A method of operating an internal combustion engine comprising the steps of:
   supplying fuel to charge air using an injector which in each operation delivers a set amount of fuel;
   controlling how much fuel is supplied to the charge air in each engine cycle by controlling how many times the injector operates in each engine cycle;
   recognising a varying state operating condition of the engine when the engine speed and/or load has varied by more than set parameter(s) between consecutive engine cycles;
   recognising a steady state operating condition of the engine when the engine speed and/or load varies by less than the set parameter(s) between consecutive engine cycles for at least a preset number of consecutive engine cycles;
   when the varying operating state condition has been recognised then for each engine cycle individually determining from engine speed and load a desired fuel demand as a number of operations of the injector calculated to at least one decimal place and rounding the desired fuel demand to a near integer to provide an output fuel demand as a number of operations of the injector for the next operating cycle; and
   when the steady state operating condition has been recognised then for a plurality of engine cycles determining from engine speed and load a desired fuel demand as an aggregate number of operations of the injector over the plurality of the operating cycles and controlling the operation of the injector over the plurality of engine cycles to achieve the desired fuel demand with the number of operations in at least one engine cycle of the plurality differing from the number of operations in other engine cycles of the plurality.

11. A method of operating an internal combustion engine comprising the steps of:
   supplying fuel to charge air using an injector which in each operation delivers a set amount of fuel;
   varying fuel supply from engine cycle to engine cycle by varying the number of operations of the injector in each engine cycle;
   at the start of each engine cycle determining a desired fuel demand for the cycle from engine speed and engine load;
   calculating a desired aggregate number of operations of the injector over a set of engine cycles of a chosen number using the most recently determined desired demand for a single cycle; and
   determining a number of operations to be implemented by the injector in the engine cycle by: calculating how many cycles are left remaining in the set of cycles; by subtracting the number of operations already performed by the injector in cycles of the set from the calculated desired aggregate number of operations; and by dividing the result of the subtraction by the number of remaining cycles and rounding the result to a near integer.

* * * * *